UNITED STATES PATENT OFFICE 1,984,633

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application March 15, 1934, Serial No. 715,773

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment, or equivalent separatory procedures.

The treating agent or demulsifying agent employed in our process consists of a mixture of petroleum sulfonic salts or a single salt and drastically oxidized castor oil. Petroleum sulfonates are recognized demulsifying agents for water-in-oil emulsions and are described in U. S. Patent No. 1,299,385, dated April 1, 1919, to Rogers, and in U. S. Patent No. 1,941,886, dated June 2, 1934, to Fischer. They may be oil-soluble or water-soluble or soluble in both oil and water. Since such solutions in water are really colloidal sols in most instances, these sulfonates may be referred to as water-miscible, rather than water-soluble.

The term "drastically oxidized castor oil", as herein used, is intended to denote those oxidized castor oils which have been oxidized very markedly as distinguished from castor oils which have been only slightly oxidized, or not oxidized at all. The oxidized oils employed as a component of the demulsifying agent contemplated by our process, are obtained solely from castor oil. Castor oil is a non-drying oil. Castor oil does not change on standing for a long period of time under exposed conditions, permitting oxidation. Thus, while the expression "artificially oxidized" is sometimes used to designate drying oils or semi-drying oils which have been oxidized by forcibly passing air or oxygen, or even ozone, through the oil, a differentiation is not necessary in the case of castor oil, because castor oil does not oxidize except artificially. The oxidation of castor oil generally takes place at a somewhat elevated temperature, for instance, 150° C., or higher. Even in the absence of an oxidizing medium such as air or oxygen, castor oil undergoes certain non-oxidized changes, due to the effect of heat alone. For instance, castor oil can be subjected to destructive distillation so as to yield a distillate containing undecylenic acid and oenanthic aldehyde. Likewise, the mass, remaining behind after distillation, is presumed to be a composition corresponding to the anhydride of triundecylenic acid. This mass is insoluble in benzene. Destructive distillation also yields some fixed gases and some water.

Castor oil can also be polymerized by heating for ten hours at 260 to 300° C. under a pressure of 4 to 6 atmospheres, so as to yield a product which is miscible with mineral oil.

Drastically oxidized castor oil has certain features in common with the products previously described, to wit, a viscous nature, oily body, etc. In order that the drastically oxidized oil, comprising a component of the demulsifying agent employed in our process, may be clearly differentiated from the previously mentioned castor oil products, we shall refer to the drastically oxidized castor oil as being benzene-soluble and oil-insoluble, the term "oil-insoluble" being used to denote the fact that if one mixes ten parts of the drastically oxidized castor oil with ninety parts of kerosene and shakes well, that eventually the drastically oxidized castor oil will settle out of solution and will leave little if any material dissolved in the kerosene.

Mild oxidation of castor oil (see "Chemical Technology and Analysis of Oils, Fats and Waxes", by Lewkowitsch, 6th Edition, Volume 2, page 406) produces relatively small modifications in certain important chemical indices, such as the iodine value, the acetyl value, and the saponification value. If drastic oxidation takes place, either by continued mild oxidation or by more vigorous oxidation at the very beginning of the reaction, as induced by either a higher temperature of reaction, or the presence of a catalyst such as manganese ricinoleate, metallic zinc, activated feldspar, or other decolorizing earths, etc., or both, then one obtains an oxidized oil of characteristics which clearly indicate that drastic oxidation has taken place. These indices of drastic oxidation are a relatively low iodine value, such as 65 or less, and may be as low as 40 or thereabouts; a saponification value of 215 to 285 or thereabouts; an acetyl value of approximately 160 to 200; and an increased viscosity; and in absence of other coloring matter, a deep orange color; and a specific gravity of almost 1 or even a trifle over 1 at times.

Drastically oxidized castor oil can be prepared by well known methods or such products can be purchased on the open market under various trade names, such as "blown castor oil", "bodied castor oil", "blended castor oil", "blended bodied castor oil", "processed castor oil", "oxidized castor oil", "heavy castor oil", "viscous castor oil", etc. These various names appear to be applied to drastically oxidized castor oils which are different in degree but not different in kind.

The treating agent or demulsifying agent which we propose to use for resolving petroleum emulsions is composed of a mixture of petroleum sulfonates of the kind described, and drastically oxidized castor oil. In producing said demulsifying agent it is preferable that both components of same be warmed to the boiling point of water and then mixed with each other and stirred. The ratio of mixture should be within the limits of 1 to 5 and 5 to 1. Any suitable solvent of the kind generally employed for dilution or thinning oil field demulsifying agents may be added, provided that said solvent is compatible with the mixture. Such solvents, include kerosene, benzene, solvent naphtha, tar acid oil, methyl alcohol, denatured alcohol, ethyl alcohol, propyl alcohol, pine oil, etc. The presence of a small amount of water is not objectionable. The petroleum sulfonates may have traces or small amounts of inorganic salts which are not objectionable. Such sulfonates may also contain unsulfonated hydrocarbons which are not objectionable. If desired, a solvent can be added to either or both components of the mixture before said components are contacted with each other. The solvent is added for purposes which are obvious, such as to give a thinner compound which is more readily handled in the operation of treating the emulsion with the demulsifying agent. Drastically oxidized oils derived from any source other than castor oil are unsatisfactory. The saponification of these drastically oxidized oils so as to yield the salts of the fatty materials present in the drastically oxidized oil results in products which are unsuited for mixture with petroleum sulfonates.

Our preferred treating agent or demulsifying agent is prepared in the following manner: Approximately 450 lbs. of oil-soluble petroleum sulfonate sodium salts (which preferably also show water-solubility or miscibility) are added to approximately 450 lbs. of drastically oxidized castor oil and the mass heated to approximately 100° C. while it is being stirred or agitated. 100 lbs. of kerosene are then added and the product is ready for use. The oil-soluble petroleum sulfonate sodium salt that we prefer to use in producing the demulsifying agent just described has the following characteristics:

Ash (after addition of $H_2SO_4$) _____ 16.50
Water _____ 2.20
Free $SO_3$ _____ 2.50
$Na_2SO_4$ equiv. to free $SO_3$ _____ 4.43
Total $SO_3$ Parr Bomb _____ 14.63
Combined $SO_3$ _____ 12.13
Saponification value _____ 1.17
Iodine value _____ 0.25

Soluble in oil, soluble or miscible in water.

The drastically oxidized castor oil that we prefer to use in producing said demulsifying agent is of the following characteristics:

Acid number _____ 15.1
Saponification number _____ 230.5
Iodine number _____ 53.5
Acetyl number _____ 164.0
Hydroxyl value _____ 188.0
Percent unsaponifiable matter _____ 1.1
Percent nitrogen _____ 0.0
Percent $SO_3$ _____ 0.0
Percent ash _____ Trace It is understood, of course, that instead of using a sodium sulfonate, one could use the potassium or the ammonium sulfonate or a triethanolamine salt of a petroleum sulfonic acid, or any other similar derivative. The product above described may be used directly or dissolved in oil, if it is oil-soluble, or it may be used in water solution if the product shows water-solubility or miscibility. The solubility in oil or water will be governed chiefly by the oil and water-solubility or miscibility of the petroleum sulfonate because the drastically oxidized castor oil is water-insoluble and also oil-insoluble.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000 above referred to, may be sufficient to produce highly satisfactory results. In general, we have found that for an average petroleum emulsion, a ratio of one part of treating agent to 5,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent comprising (a) benzene-soluble, oil-insoluble, drastically oxidized castor oil, and (b) salts of petroleum sulfonic acids, said components being mixed within the ratio of 1 to 5 and 5 to 1.

2. A process for breaking petroleum emulsions of the water-in-oil type, which consists in subjecting the emulsion to the action of a demulsifying agent comprising (a) benzene-soluble, oil-insoluble, drastically oxidized castor oil, and (b) an oil-soluble salt of petroleum sulfonic acid, said components being mixed within the ratio of 1 to 5 and 5 to 1.

3. A process for breaking petroleum emulsions of the water-in-oil type, which consists in subjecting the emulsion to the action of a demulsifying agent comprising (a) benzene-soluble, oil-insoluble, drastically oxidized castor oil, and (b) an oil-soluble salt of petroleum sulfonic acid, having also the property of water-miscibility, said components being mixed within the ratio of 1 to 5 and 5 to 1.

4. A process for breaking petroleum emulsions of the water-in-oil type, which consists in subjecting the emulsion to the action of a demulsifying agent comprising (a) benzene-soluble, oil-insoluble, drastically oxidized castor oil, and (b) an oil-soluble salt of petroleum sulfonic acid having also the property of water-miscibility, said components being mixed in equal parts.

5. A process for breaking petroleum emulsions of the water-in-oil type, which consists in subjecting the emulsion to the action of a demulsifying agent comprising (a) benzene-soluble, oil-insoluble, drastically oxidized castor oil, (b) an oil-soluble salt of petroleum sulfonic acid having also the property of water-miscibility, and (c) a solvent, the components (a) and (b) being mixed in equal parts.

6. A process for breaking petroleum emulsions of the water-in-oil type, which consists in subjecting the emulsion to the action of a demulsifying agent comprising (a) benzene-soluble, oil-insoluble, drastically oxidized castor oil, (b) an oil-soluble salt of petroleum sulfonic acid having also the property of water-miscibility, and (c) kerosene, the components (a) and (b) being mixed in equal parts.

7. A process for breaking petroleum emulsions of the water-in-oil type, which consists in subjecting the emulsion to the action of a demulsifying agent composed of 45 parts, by weight, of water-miscible and oil-soluble petroleum sulfonate sodium salts, 45 parts, by weight, of drastically oxidized castor oil, and 10 parts, by weight, of kerosene.

MELVIN DE GROOTE.
BERNHARD KEISER.